US012762050B2

(12) United States Patent
Liu

(10) Patent No.: US 12,762,050 B2
(45) Date of Patent: Oct. 13, 2026

(54) MEMORY CONTROLLER AND MEMORY SYSTEM HANDLING POWER LOSS

(71) Applicant: YANGTZE MEMORY TECHNOLOGIES CO., LTD., Wuhan (CN)

(72) Inventor: Weilin Liu, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/911,900

(22) Filed: Oct. 10, 2024

(65) Prior Publication Data

US 2026/0072823 A1 Mar. 12, 2026

Related U.S. Application Data

(63) Continuation of application No. PCT/CN2024/117985, filed on Sep. 10, 2024.

(51) Int. Cl.
*G06F 12/02* (2006.01)
*G06F 1/30* (2006.01)
(Continued)

(52) U.S. Cl.
CPC ............ *G06F 12/0246* (2013.01); *G06F 1/30* (2013.01); *G06F 11/07* (2013.01); *G06F 11/08* (2013.01);
(Continued)

(58) Field of Classification Search
CPC ........ G06F 12/0246; G06F 1/30; G06F 11/07; G06F 11/08; G06F 11/1402; G06F 11/1446; G06F 2212/1032
See application file for complete search history.

(56) References Cited

U.S. PATENT DOCUMENTS

2010/0005229 A1* 1/2010 Hsiao .................... G06F 11/141 711/E12.001
2010/0128524 A1* 5/2010 Hadas ................. G11C 11/5628 365/185.03

(Continued)

FOREIGN PATENT DOCUMENTS

CN 101763490 A 6/2010
CN 114880319 A 8/2022
KR 20230068240 A 5/2023

OTHER PUBLICATIONS

S. Lee, S. Jung and Y. H. Song, "A-PLR: Accumulative backup of mapping information for power loss recovery," 2010 2nd IEEE InternationalConference on Network Infrastructure and Digital Content, Beijing, China, 2010, pp. 264-269 (Year: 2010).*

(Continued)

*Primary Examiner* — Reginald G Bragdon
*Assistant Examiner* — Zakaria Mohammed Belkhayat
(74) *Attorney, Agent, or Firm* — BAYES PLLC

(57) ABSTRACT

In certain aspects, a memory system includes a non-volatile memory device, and a memory controller coupled to the non-volatile memory device. The memory controller is configured to generate indicator data based on data to be initially programmed to the non-volatile memory device, and, in response to power loss of the memory system, control transmission of the indicator data to the non-volatile memory device. The indicator data is configured to recover the source data.

20 Claims, 9 Drawing Sheets

(51) Int. Cl.
*G06F 11/07* (2006.01)
*G06F 11/08* (2006.01)
*G06F 11/14* (2026.01)
*G06F 11/1446* (2026.01)

(52) U.S. Cl.
CPC ...... *G06F 11/1402* (2013.01); *G06F 11/1446* (2013.01); *G06F 2212/1032* (2013.01)

(56) References Cited

U.S. PATENT DOCUMENTS

| | | | | |
|---|---|---|---|---|
| 2017/0139783 | A1 | 5/2017 | Hwang et al. | |
| 2017/0249087 | A1 | 8/2017 | Shekhar et al. | |
| 2022/0107751 | A1 | 4/2022 | Gorobets et al. | |
| 2022/0237118 | A1* | 7/2022 | Avraham ............ | G06F 11/1004 |
| 2022/0246181 | A1* | 8/2022 | Lin ........................ | G11C 5/141 |
| 2022/0404989 | A1 | 12/2022 | Yang et al. | |
| 2023/0282294 | A1 | 9/2023 | Gorobets et al. | |
| 2023/0297247 | A1 | 9/2023 | Kanno et al. | |
| 2023/0342052 | A1* | 10/2023 | Chen ....................... | G06F 3/064 |
| 2024/0062840 | A1 | 2/2024 | Winterfeld et al. | |

OTHER PUBLICATIONS

Rahul Awati and Ed Hannan, “What is parity in computing?”, TechTarget, Jul. 2024 (Year: 2024).*
International Search Report issued in corresponding International Application No. PCT/CN2024/11095, mailed on Jun. 4, 2025, 6 pages.

* cited by examiner

500

MEMORY CONTROLLER AND MEMORY SYSTEM HANDLING POWER LOSS

CROSS-REFERENCE TO RELATED APPLICATIONS

This application is a continuation of International Application No. PCT/CN2024/117985, filed on Sep. 10, 2024, which is hereby incorporated by reference in its entirety.

BACKGROUND

The present disclosure relates to memory devices and operation methods thereof.

Flash memory is a low-cost, high-density, non-volatile solid-state storage medium that can be electrically erased and reprogrammed. Flash memory includes NOR Flash memory and NAND Flash memory. Various operations can be performed by Flash memory, such as read, program (write), and erase. For NAND Flash memory, an erase operation can be performed at the block level, and a program operation or a read operation can be performed at the page level.

SUMMARY

In one aspect, a memory system includes a non-volatile memory device, and a memory controller coupled to the non-volatile memory device. The memory controller is configured to generate indicator data based on source data to be initially programmed to the non-volatile memory device, and in response to power loss of the memory system, control transmission of the indicator data to the non-volatile memory device. The indicator data is configured to recover the source data.

In some implementations, the memory controller is further configured to control initial programming of the source data to the non-volatile memory device to become intermediate data on the non-volatile memory device.

In some implementations, the memory controller is further configured to in response to power resume of the memory system, retrieve the intermediate data and the indicator data, and recover the source data based on the intermediate data and the indicator data.

In some implementations, the non-volatile memory device is configured to, in response to power resume of the memory system, recover the source data based on the intermediate data and the indicator data, and transmit the recovered source data to the memory controller.

In some implementations, the non-volatile memory device is configured to after the initial programming of the source data, further program the source data to become programmed data.

In some implementations, the indicator data includes a bitmap.

In some implementations, a size of the indicator data is smaller than a size of the source data.

In some implementations, the memory controller includes a volatile memory configured to store the indicator data.

In some implementations, the memory system further includes a power loss protection (PLP) circuit coupled to the memory controller and the non-volatile memory device and configured to provide power to the memory controller and the non-volatile memory device in response to the power loss of the memory system.

In some implementations, the memory controller is configured to control transmission of the indicator data to the non-volatile memory device only in response to the power loss of the memory system.

In some implementations, the non-volatile memory device includes a NAND Flash memory device.

In another aspect, a memory controller includes an interface coupled to a non-volatile memory device, and a processor coupled to the interface. The processor is configured to generate indicator data based on source data to be initially programmed to the non-volatile memory device, and in response to power loss of the memory controller, control transmission of the indicator data to the non-volatile memory device through the interface. The indicator data is configured to recover the source data.

In some implementations, the processor is configured to control initial programming of the source data to the non-volatile memory device to become intermediate data on the non-volatile memory device through the interface.

In some implementations, the interface is further configured to in response to power resume of the memory controller, retrieve the intermediate data and the indicator data from the non-volatile memory device. In some implementations, the processor is further configured to recover the source data based on the intermediate data and the indicator data.

In some implementations, the interface is further configured to receive recovered data from the non-volatile memory device. In some implementations, the source data is recovered by the non-volatile memory device based on the intermediate data and the indicator data in response to power resume of the memory controller.

In some implementations, the processor is further configured to after the initial programming of the source data, control programming of the source data to the non-volatile memory device to become programmed data on the non-volatile memory device.

In some implementations, the indicator data includes a bitmap.

In some implementations, a size of the indicator data is smaller than a size of the source data.

In some implementations, the memory controller further includes a volatile memory configured to store the indicator data.

In some implementations, the processor is configured to control the transmission of the indicator data to the non-volatile memory device only in response to the power loss of the memory controller.

In still another aspect, a method for operating a memory controller is provided. Indicator data is generated based on source data to be initially programmed to a non-volatile memory device. The indicator data is configured to recover the source data. In response to power loss, the indicator data is transmitted to the non-volatile memory device.

In some implementations, a command is transmitted to the non-volatile memory device indicative of initially programming the source data to become intermediate data on the non-volatile memory device.

In some implementations, in response to power resume, the intermediate data and the indicator data are retrieved from the non-volatile memory device, and the source data is recovered based on the intermediate data and the indicator data.

In some implementations, recovered data is received from the non-volatile memory device. In some implementations, the source data is recovered by the non-volatile memory device based on the intermediate data and the indicator data in response to power resume.

In some implementations, the indicator data includes a bitmap.

In some implementations, a size of the indicator data is smaller than a size of the source data.

In some implementations, the indicator data is stored in a volatile memory.

In some implementations, the indicator data is transmitted to the non-volatile memory device only in response to the power loss.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1:
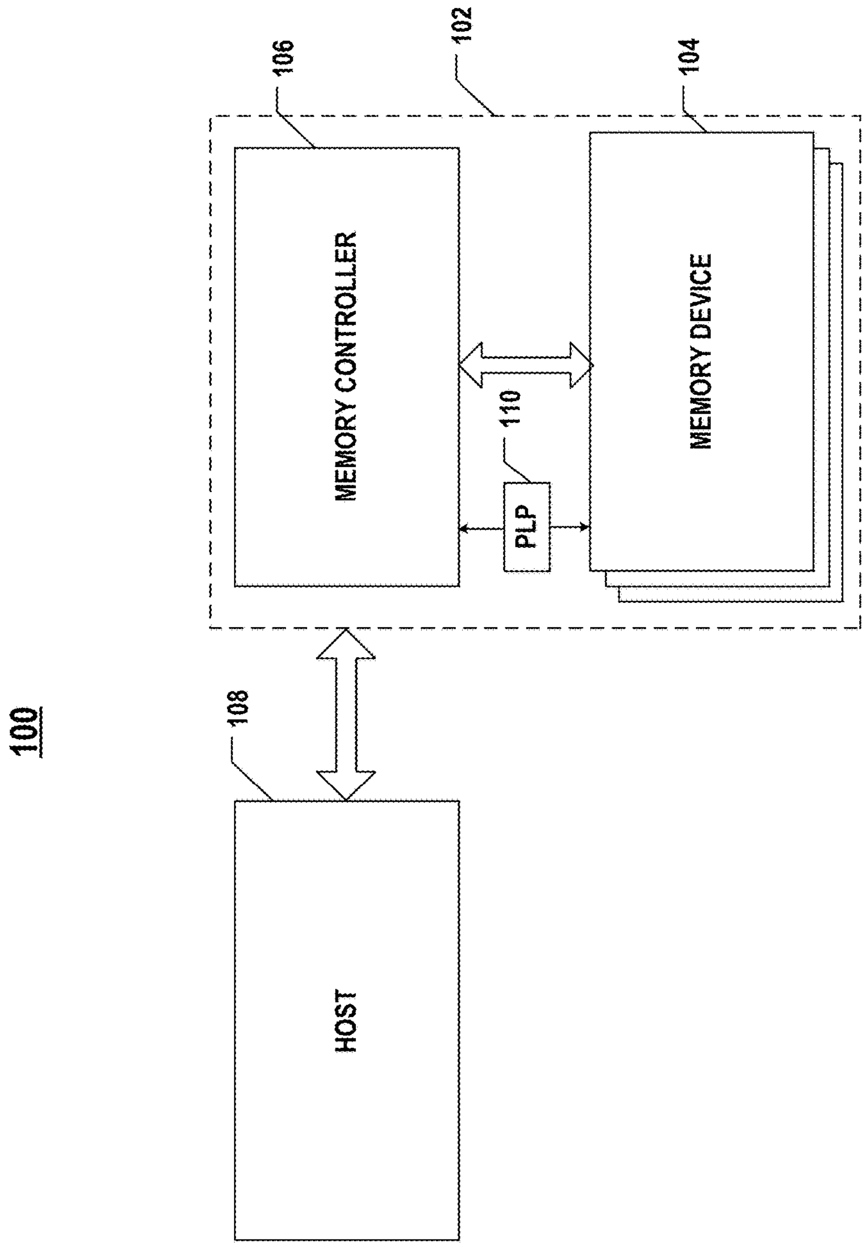
FIG. 1 illustrates a block diagram of a system including a memory system, according to some aspects of the present disclosure.

The present disclosure will be described with reference to the accompanying drawings.

DETAILED DESCRIPTION

In general, terminology may be understood at least in part from usage in context. For example, the term “one or more” as used herein, depending at least in part upon context, may be used to describe any feature, structure, or characteristic in a singular sense or may be used to describe combinations of features, structures or characteristics in a plural sense. Similarly, terms, such as “a,” “an,” or “the,” again, may be understood to convey a singular usage or to convey a plural usage, depending at least in part upon context. In addition, the term “based on” may be understood as not necessarily intended to convey an exclusive set of factors and may, instead, allow for existence of additional factors not necessarily expressly described, again, depending at least in part on context.

Non-volatile memory devices, such as NAND Flash memory devices, can store more than a single bit of information in each memory cell at multiple levels (a.k.a., states) in order to increase the storage capacity and reduce the cost per bit. In program operations, the source data may be programmed (written) into xLCs, such as multi-level cells (MLCs), trip-level cells (TLCs), quad-level cells (QLCs), etc. For xLCs, for example, QLCs, multi-pass program operations can be used to reduce program time and increase read window margin (RWM), which involve a coarse program pass that initially programs the xLCs to one of the intermediate levels, as well as a fine program pass that further programs the xLCs from the intermediate levels to the final levels.

On the other hand, in a multi-pass program operation, if power loss occurs between the coarse program pass and the fine program pass, after the power resumes, the source data to be programmed cannot be correctly recovered solely based on the intermediate data after the coarse program pass due to the small RWNs of the intermediate levels. To enable data recovery, once power loss occurs, some NAND Flash memory devices may retrieve the source data again and generate auxiliary data based on the source data, which can facilitate data recovery. When power resumes, the NAND Flash memory devices may recover the source data based on the intermediate data and the auxiliary data. However, data retrieval to the NAND Flash memory devices after power loss can cause a significant delay, especially for xLCs having a large amount of data to be transferred and written on the NAND Flash memory devices, which requires an undesirable, longer power loss protection (PLP) period.

To address one or more of the aforementioned issues, the present disclosure introduces power loss handling schemes that prepare indicator data in advance of power loss by a memory controller when the memory controller transfers data to the non-volatile memory device (e.g., NAND Flash memory device) in the coarse program pass, and that transmit only the already-prepared indicator data to the non-volatile memory device when the power loss occurs. Thus, the amount of data that needs to be transmitted from the memory controller to the non-volatile memory device, as well as the required PLP period, can be significantly reduced, thereby improving the performance of the memory system. The indicator data can be stored in a volatile memory (e.g., DRAM device) without additional written overhead to the non-volatile memory device and can have a reduced size as it can be refreshed as the input data refreshes.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive host data (a.k.a. user data) to or from memory system 102.

Memory system 102 can be a storage product integrating memory controller 106 and one or more memory devices 104, such as an SSD.

Memory devices 104 can be any memory devices disclosed in the present disclosure, including non-volatile memory devices, such as NAND Flash memory devices. In some implementations, memory device 104 also includes one or more volatile memory devices, such as DRAM devices or static random-access memory (SRAM) devices.

Memory controller 106 is operatively coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, logical-to-physical (L2P) address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Consistent with the scope of the present disclosure and disclosed below in detail, memory controller 106 can be configured to generate indicator data based on source data to be initially programmed to memory device 104. Memory controller 106 can also be configured to in response to power loss of memory system 102, transmit the indicator data to memory device 104. As shown in FIG. 1, memory system 102 can further include a PLP circuit 110 coupled to memory controller 106 and memory device 104 and configured to provide power to memory controller 106 and memory device 104 in response to the power loss of memory system 102. PLP circuit 110 can safeguard data during unexpected power outages, for example, by detecting an imminent power loss, sending a signal to memory controller 106 to trigger power loss handling, and providing temporary power to memory system 102 for a limited time period using capacitors or other energy storage components. The temporary power thus can allow memory system 102 to perform various power loss handling processes to ensure data integrity and prevent data corruption or loss during unexpected power outages, such as transferring indicator data to memory device 104, and other processes as described below in detail. In some implementations, PLP circuit 110 includes one or more capacitors as energy storage components, and the amount of temporary power and the resulting time window for power loss handling that can be provided by PLP circuit 110 are determined based on the number of capacitors.

Figure 2A:
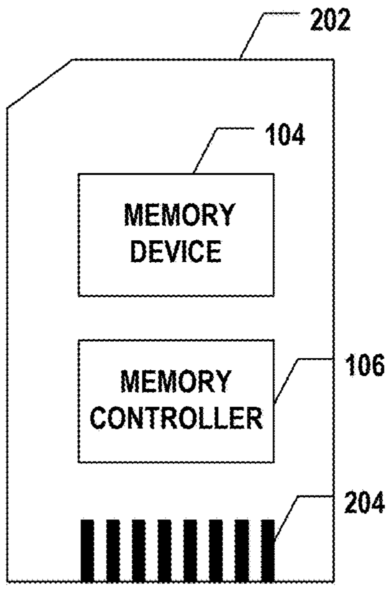
FIG. 2A illustrates a diagram of a memory card having a memory device, according to some aspects of the present disclosure.
Figure 2B:
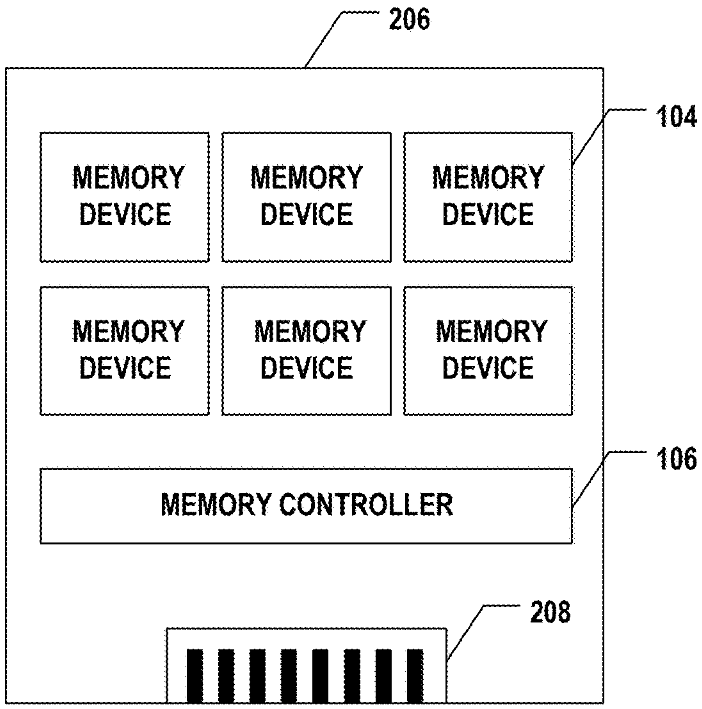
FIG. 2B illustrates a diagram of a solid-state disk (SSD) having memory devices, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Figure 3:
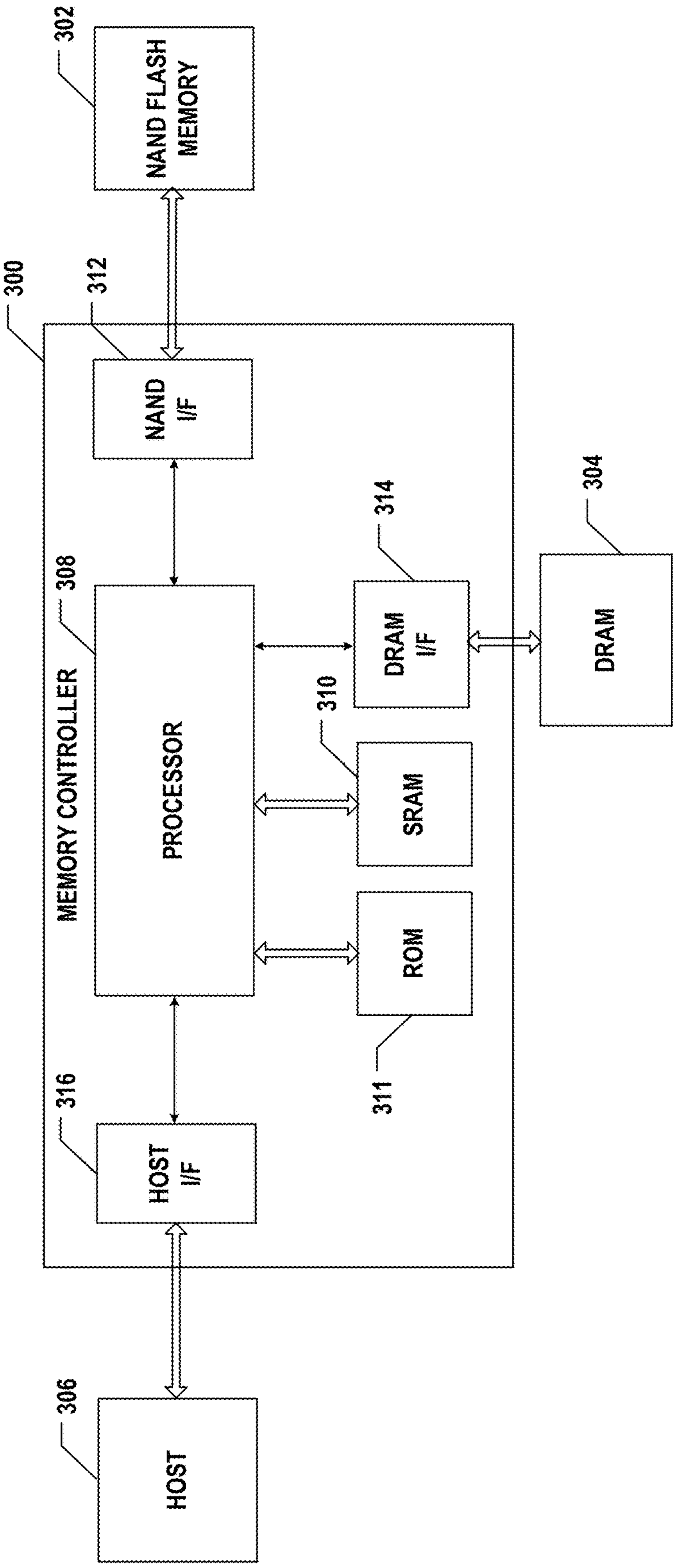
FIG. 3 illustrates a block diagram of a memory controller, according to some aspects of the present disclosure.

FIG. 3 illustrates a block diagram of a memory controller 300, according to some aspects of the present disclosure. Memory controller 300 may be one example of memory controller 106 in FIG. 1. As shown in FIG. 3, memory controller 300 can include a processor 308, an SRAM 310, and a read-only memory (ROM) 311. In some implementations, processor 308 is implemented by microprocessors (e.g., digital signal processors (DSPs)) or microcontrollers (a.k.a. microcontroller units (MCUs)) that execute firmware and/or software modules to perform the various functions described herein. The various firmware modules in memory controller 300 described herein can be implemented as firmware codes or instructions stored in ROM 311 and executed by processor 308. In some implementations, processor 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3, memory controller 300 can also include various input/output (I/O) interfaces (I/F), such as a NAND interface 312, a DRAM interface 314, and a host interface 316 operatively coupled to NAND Flash memory 302 (e.g., an example of non-volatile memory devices), DRAM 304 (e.g., an example of volatile memory devices), and a host 306 (e.g., an example of host 108), respectively.

NAND interface 312, DRAM interface 314, and host interface 316 can be configured to transfer data, command, clock, or any suitable signals between processor 308 and NAND Flash memory 302, DRAM 304, and host 306, respectively. NAND interface 312, DRAM interface 314, and host interface 316 can implement any suitable communication protocols facilitating data transfer, communication, and management, such as the NVMe protocol and PCI-E protocol, double data rate (DDR) protocol, to name a few.

As described above, both SRAM 310 and DRAM 304 may be considered as volatile memory devices that can be controlled and accessed by memory controller 300 in a memory system. A cache can be implemented as part of volatile memory devices, for example, by SRAM 310 and/or DRAM 304. It is understood that although FIG. 3 shows that SRAM 310 is within memory controller 300 and DRAM 304 is outside of memory controller 300, in some examples, both SRAM 310 and DRAM 304 may be within memory controller 300 or outside of memory controller 300.

Figure 4:
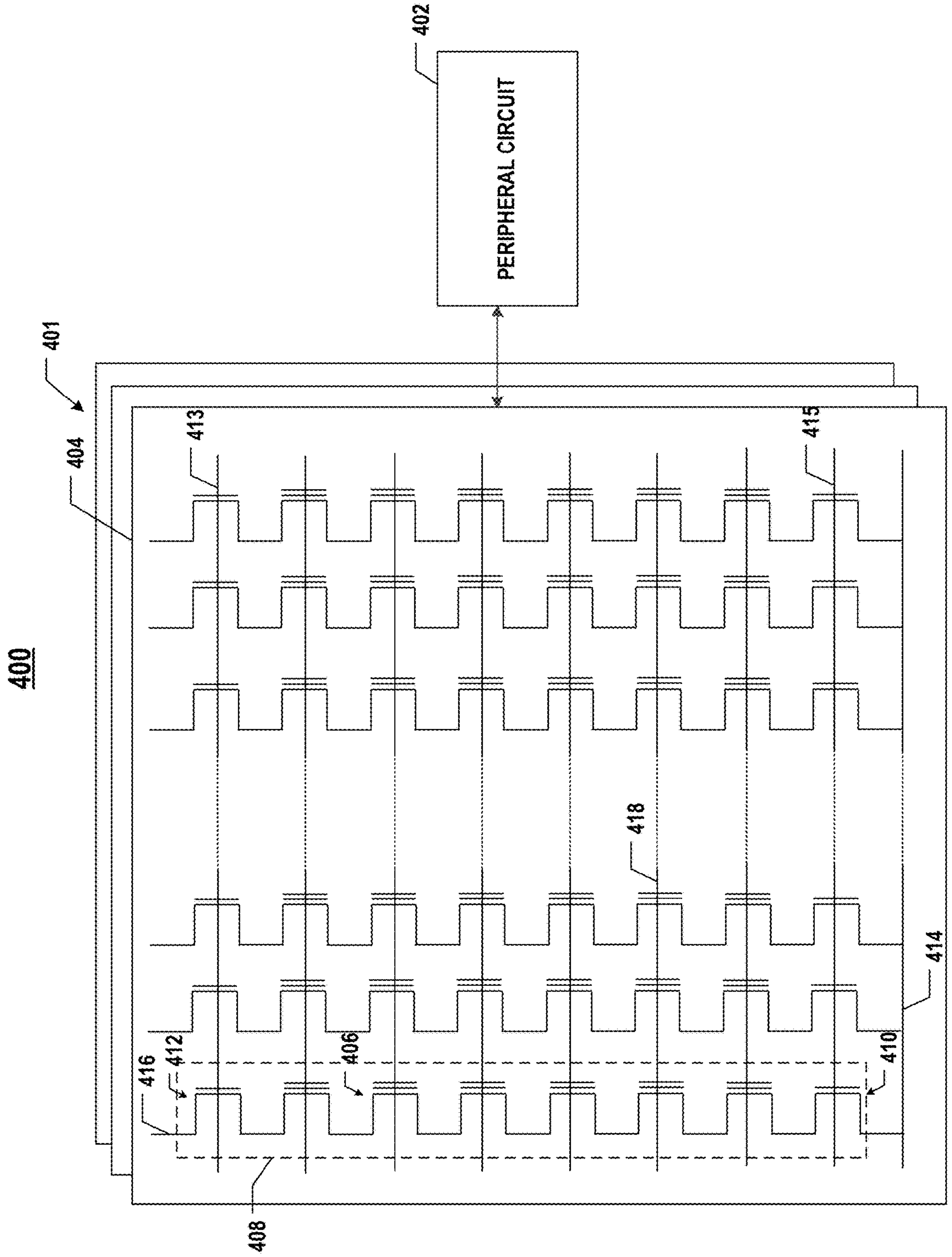
FIG. 4 illustrates a schematic diagram of a NAND Flash memory device, according to some aspects of the present disclosure.

FIG. 4 illustrates a schematic circuit diagram of a NAND Flash memory device 400 including peripheral circuits 402, according to some aspects of the present disclosure. NAND Flash memory device 400 may be one example of NAND Flash memory 302 in FIG. 3. NAND Flash memory device 400 can include a memory cell array 401 and peripheral circuits 402 operatively coupled to memory cell array 401. Memory cells 406 in memory cell array 401 are provided in the form of an array of NAND memory strings 408 each extending vertically above a substrate (not shown). In some implementations, each NAND memory string 408 includes a plurality of memory cells 406 operatively coupled in series and stacked vertically. Each memory cell 406 can hold a continuous, analog value, such as an electrical voltage or charge, which depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible levels (memory states) and thus, can store one bit of data. For example, the first state “0” can correspond to a first range of threshold voltages, and the second state “1” can correspond to a second range of threshold voltages. In some implementations, each memory cell 406 is an xLC that is capable of storing more than a single bit of data in more than four levels. For example, the xLC may store two bits per cell (a.k.a., multi-level cell (MLC)), three bits per cell (a.k.a., triple-level cell (TLC)), or four bits per cell (a.k.a. quad-level cell (QLC)). Each xLC can be programmed to assume a range of possible nominal storage values (i.e., corresponding to $2^N$ pieces of N-bits data). In some implementations, each memory cell 406 is set to one of $2^N$ levels corresponding to a piece of N-bits data, where N is an integer greater than 2.

As shown in FIG. 4, each NAND memory string 408 can also include a source select gate (SSG) transistor 410 at its source end and a drain select gate (DSG) transistor 412 at its drain end. SSG transistor 410 and DSG transistor 412 can be configured to activate select NAND memory strings 408 (columns of the array) during read and program operations. In some implementations, the sources of NAND memory strings 408 in the same block 404 are coupled through a same source line (SL) 414, e.g., a common SL. In other words, all NAND memory strings 408 in the same block 404 have an array common source (ACS), according to some implementations. The drain of each NAND memory string 408 is coupled to a respective bit line 416 from which data can be read or written via an output bus (not shown), according to some implementations. In some implementations, each NAND memory string 408 is configured to be selected or deselected by applying a select voltage or a deselect voltage to the gate of respective DSG transistor 412 through one or more DSG lines 413 and/or by applying a select voltage or a deselect voltage to the gate of respective SSG transistor 410 through one or more SSG lines 415.

As shown in FIG. 4, NAND memory strings 408 can be organized into multiple blocks 404, each of which can have a common source line 414, e.g., coupled to the ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive bias voltage (e.g., 20 V or more). Memory cells 406 of adjacent NAND memory strings 408 can be coupled through word lines 418 that select which row of memory cells 406 is affected by read and program operations. In some implementations, each word line 418 is coupled to a plurality of memory cells 406. Each word line 418 can include a plurality of control gates (gate electrodes) at each memory cell 406 in a row and a gate line coupling the control gates.

Peripheral circuits 402 can be operatively coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each select memory cell 406 through bit lines 416, word lines 418, source lines 414, SSG lines 415, and DSG lines 413. Peripheral circuits 402 can include various types of peripheral circuits formed using complementary metal-oxide-semiconductor (CMOS) technologies, such as page buffers/sense amplifiers, column decoders/bit line drivers, row decoders/word line drivers, voltage generators, control logic, registers, interfaces, and data buses.

Figure 5:
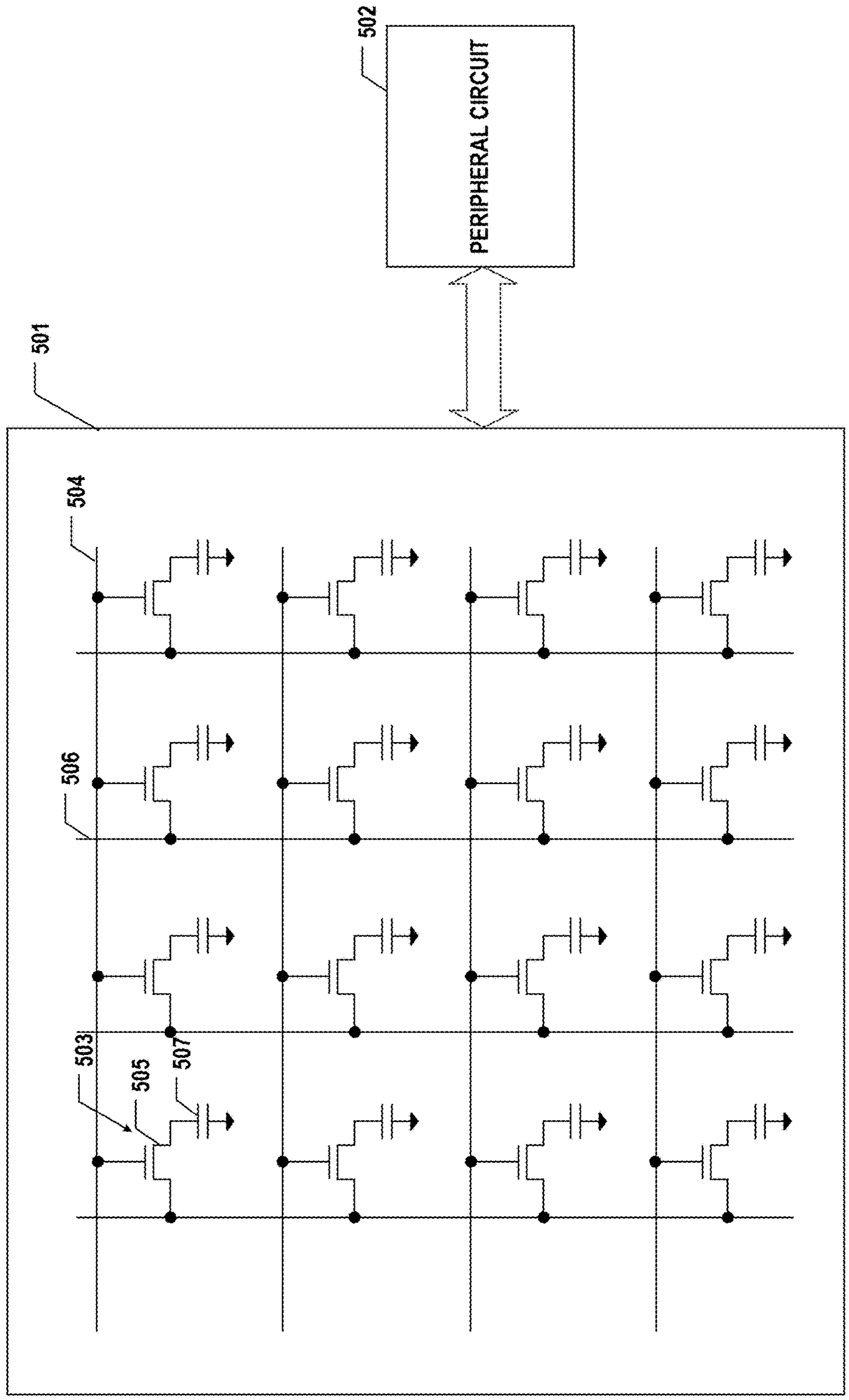
FIG. 5 illustrates a schematic diagram of a dynamic random-access memory (DRAM) device, according to some aspects of the present disclosure.

FIG. 5 illustrates a schematic circuit diagram of a DRAM device 500 including peripheral circuits 502, according to some aspects of the present disclosure. DRAM device 500 may be one example of DRAM 304 in FIG. 3. DRAM device 500 can include a memory cell array 501 and peripheral circuits 502 operatively coupled to memory cell array 501. Memory cells 503 can be arranged in memory cell array 501 having rows and columns. DRAM device 500 requires periodic refreshing of memory cells 503. In some implementations, each memory cell 503 includes a capacitor 507 for storing a bit of data as a positive or negative electrical charge as well as a transistor 505 that controls access to capacitor 507. That is, each memory cell 503 shown in FIG. 5 is a one-transistor, one-capacitor (1T1C) cell, according to some implementations.

DRAM device 500 can include word lines 504 coupling peripheral circuits 502 and memory cell array 501 for controlling the switch of transistors 505 in memory cells 503 located in a row, as well as bit lines 506 coupling peripheral circuits 502 and memory cell array 501 for sending data to and/or receiving data from memory cells 503 located in a column. That is, each word line 504 is coupled to a respective row of memory cells 503, and each bit line 506 is coupled to a respective column of memory cells 503. The gate of transistor 505 can be coupled to word line 504, one of the source and the drain of transistor 505 can be coupled to bit line 506, the other one of the source and the drain of transistor 505 can be coupled to one electrode of capacitor 507, and the other electrode of capacitor 507 can be coupled to the ground.

Peripheral circuits 502 can be coupled to memory cell array 501 through bit lines 506, word lines 504, and any other suitable metal wirings. Peripheral circuits 502 can include any suitable circuits for facilitating the operations of memory cell array 501 by applying and sensing voltage signals and/or current signals through word lines 504 and bit lines 506 to and from each memory cell 503. Peripheral circuits 502 can include various types of peripheral circuits formed using CMOS technologies, such as page buffers/sense amplifiers, column decoders/bit line drivers, row decoders/word line drivers, voltage generators, control logic, registers, interfaces, and data buses.

Figure 6:
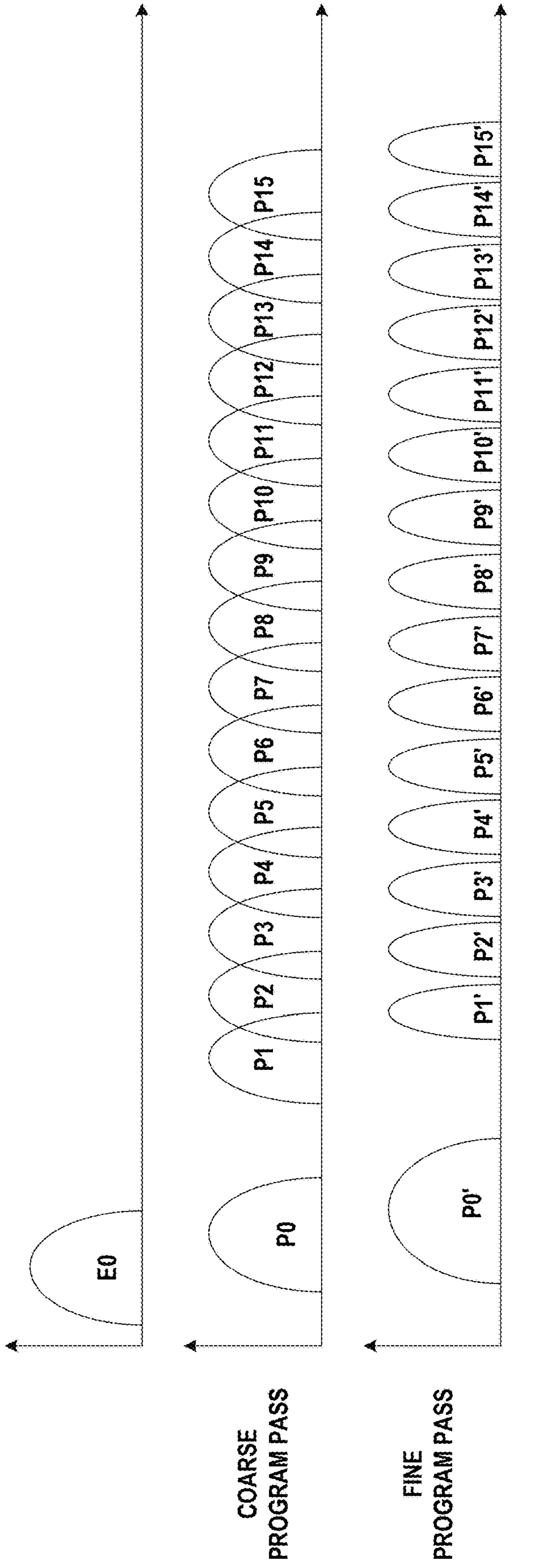
FIG. 6 illustrates an example of threshold voltage distributions of memory cells in a multi-pass program operation applied to quad-level cells (QLCs), according to some aspects of the present disclosure.
Figure 9:
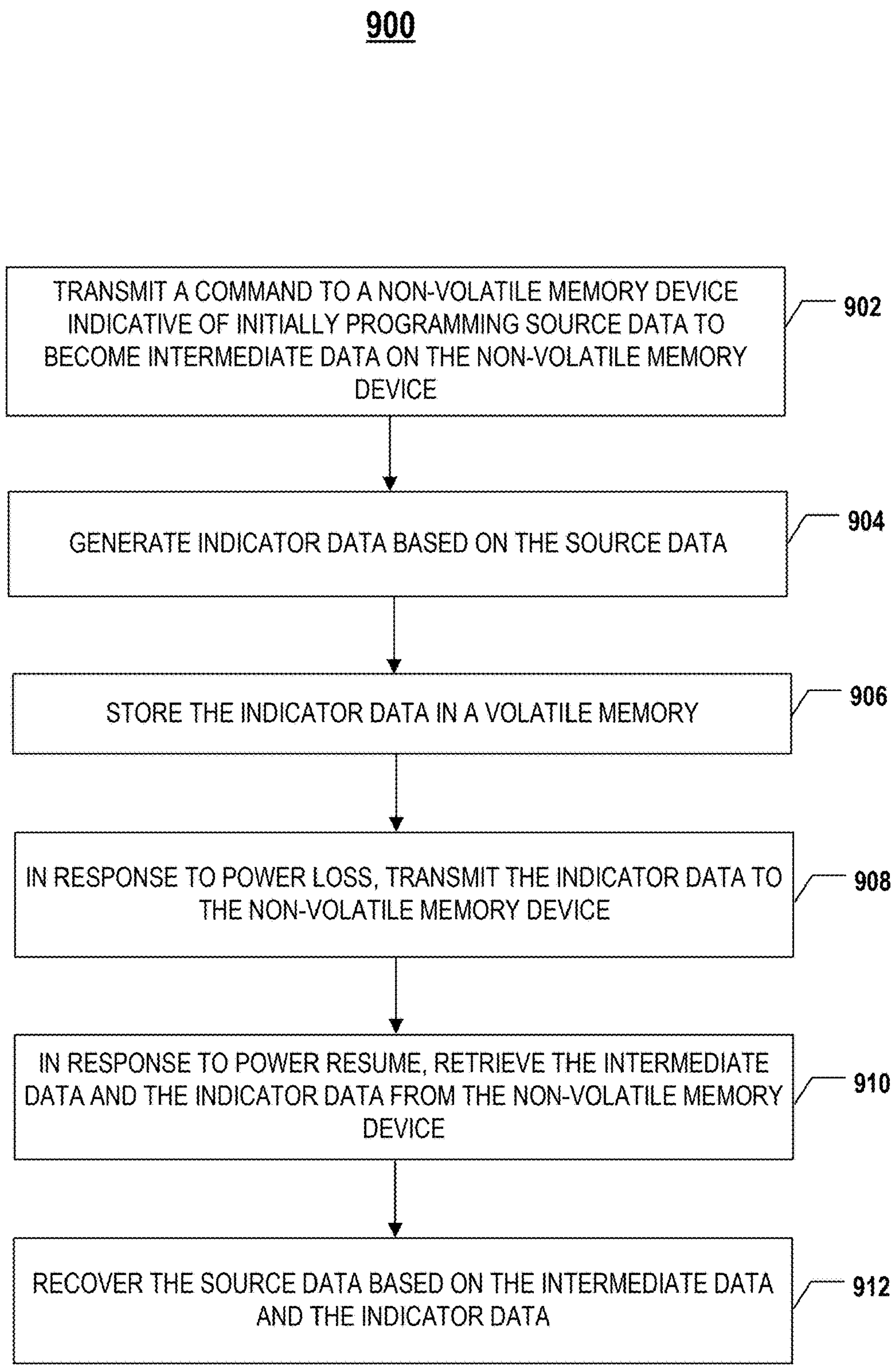
FIG. 9 illustrates a flowchart of a method for operating a memory controller, according to some aspects of the present disclosure.

Consistent with the scope of the present disclosure, memory system 102 can perform a multi-pass program operation that includes a coarse program pass and a fine program pass. For example, FIG. 6 illustrates an example of threshold voltage distributions of memory cells in a multi-pass program operation applied to QLCs, according to some aspects of the present disclosure. In this example, the number of intermediate levels after the coarse program pass is equal to the number of final levels, e.g., 16 for QLCs. As shown in FIG. 9, in some implementations, after the coarse program pass, the source data from memory controller 106 is initially programmed to memory device 104 as intermediate data by setting each memory cell to one of 16 intermediate levels P0-P15 based on a preset Gray code; after the fine program pass, the source data from memory controller 106 is further programmed to memory device 104 as programmed data by setting each memory cell to one of 16 final levels P0'-P15' based on the Gray code. In a read operation, the programmed data after the fine program pass can be read using a set of default read voltages applied to distinguish each two adjacent final levels. However, as shown in FIG. 9, compared with the final levels, the RWMs of the intermediate levels are much smaller or even indistinguishable. Thus, the intermediate data after the coarse program pass in a multi-pass program operation may not be directly read out by a read operation, for example, when power loss occurs between the coarse program pass and fine program pass.

Figure 7:
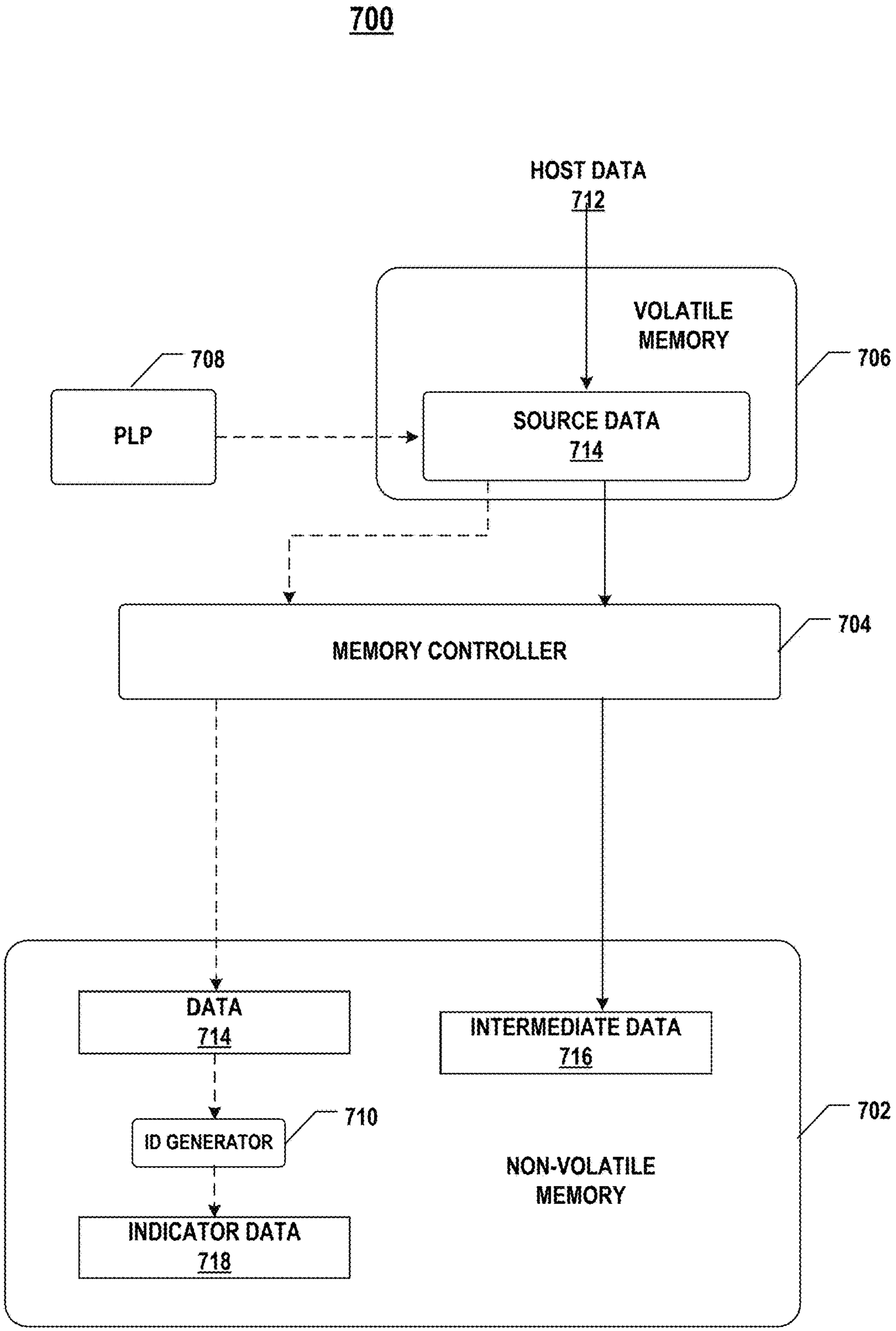
FIG. 7 illustrates a schematic diagram of power loss handling by a memory system.

In order to recover the source data to resume or repeat the interrupted program operation after power resumes, auxiliary data may be used to help recover the source data based on the intermediate data. For example, FIG. 7 illustrates a schematic diagram of power loss handling by a memory system 700. In the coarse program pass of a multi-pass program operation, host data 712 is converted to source data to be initially programed to a non-volatile memory device 702 (referred to herein as source data 714), which is stored in a volatile memory device 706. A memory controller 704 transmits source data 714 from volatile memory device 706 to non-volatile memory device 702 for initial programming (a.k.a. coarse programming) of source data 714 into intermediate data 716. The above-described data transfer processes occur when memory system 700 is powered on (without power loss), which are labeled by solid line arrows. In case power loss happens to memory system 700, a PLP circuit 708 detects the power loss and triggers power loss handling processes of memory system 700, including transmitting source data 714 stored in volatile memory device 706 to non-volatile memory device 702 again. An indicator (ID) data generator 710 of non-volatile memory device 702 then generates indicator data 718 based on source data 714, which is stored in non-volatile memory device 702. The data transfer and generation processes triggered by power loss are labeled by dash line arrows. Once power resumes, non-volatile memory device 702 may recover source data 714 based on intermediate data 716 and indicator data 718. However, as the storage capacity of non-volatile memory device 702 (and the corresponding size of source data 714) keeps increasing, the time required to complete the data transfer and generation processes of handling power loss handling keeps increasing too, thereby requiring more and/or larger capacitors in PLP circuit 708 to provide sufficient temporary power.

Consistent with the scope of the present disclosure, to reduce the power handling time, indicator data can be generated in advance of power loss, such that the indicator data, instead of the source data, is generated, can be transferred in response to power loss to reduce the bandwidth and time since the size of the indicator data is smaller than the original data. Moreover, the indicator data can be generated by the memory controller, instead of the non-volatile memory device, and cached and refreshed in the volatile memory, to further reduce offload the non-volatile memory device for data transfer and generation.

Figure 8:
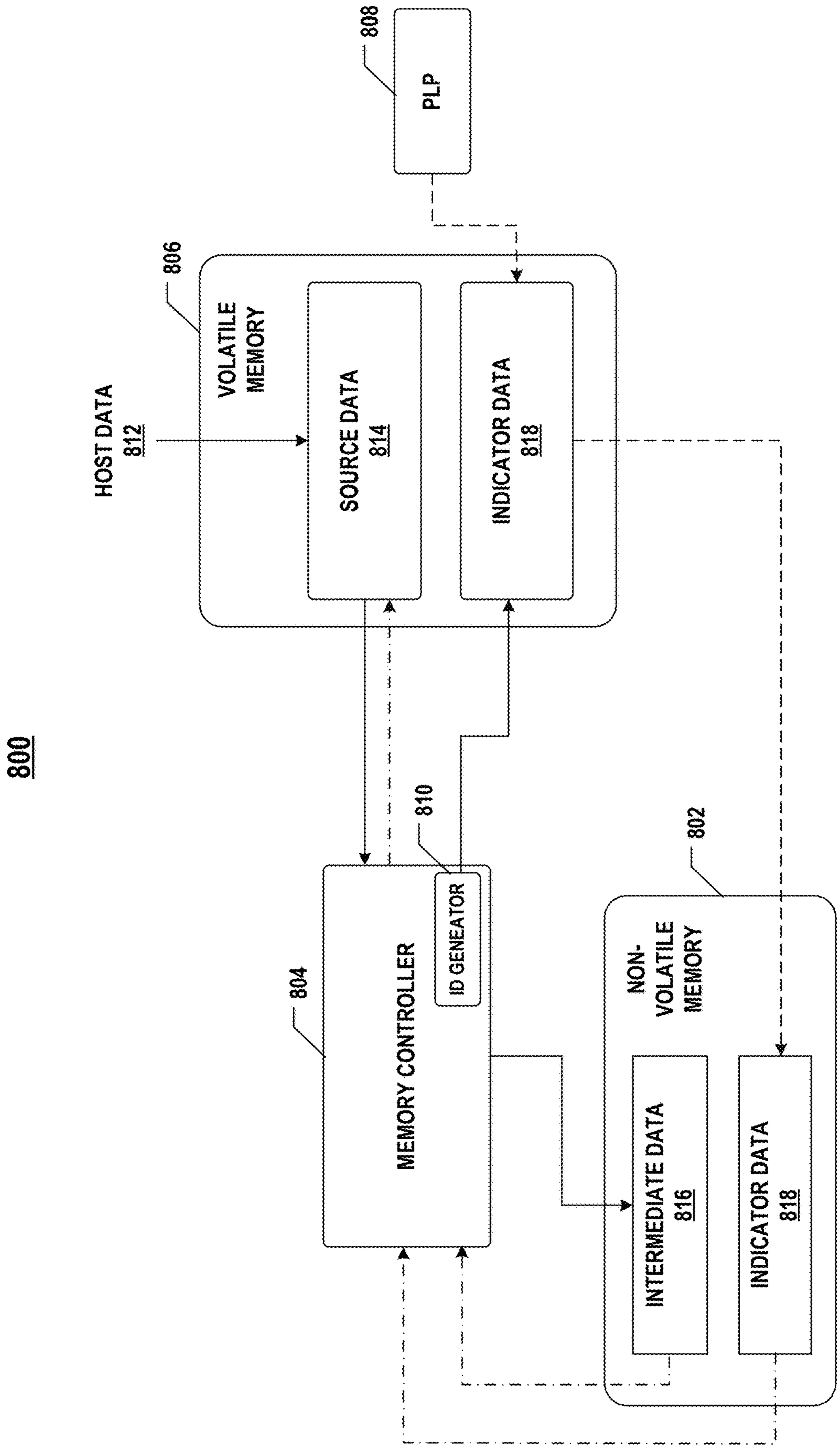
FIG. 8 illustrates a schematic diagram of power loss handling by a memory system, according to some aspects of the present disclosure.

For example, FIG. 8 illustrates a schematic diagram of power loss handling by a memory system 800, according to some aspects of the present disclosure. Memory system 800 may be an example of memory system 102. As shown in FIG. 8, memory system 800 can include a non-volatile memory device 802, a memory controller 804, a volatile memory device 806, and a PLP circuit 808. Memory controller 804 may be one example of memory controller 106 in FIG. 1 and may be implemented as memory controller 300 in FIG. 3. Volatile memory device 806 and non-volatile memory device 802 may be examples of memory devices 104 in FIG. 1. In some implementations, volatile memory device 806 includes DRAM (e.g., DRAM device 500 in FIG. 5), and non-volatile memory device 802 includes NAND Flash memory (e.g., NAND Flash memory device 400 in FIG. 4).

In the coarse program pass of a multi-pass program operation, host data 812 (a.k.a., user data) from a host (not shown, e.g., host 108 in FIG. 1) can be converted to source data 814 using any suitable data pre-processing (DPP) methods and temporarily stored (cached) in volatile memory device 806. Source data 814 is to be initially programmed (a.k.a, coarse programmed) to non-volatile memory device 802 in the coarse program pass to become intermediate data 816 with intermediate levels, according to some implementations. In some implementations, memory controller 804 is configured to transmit source data 814 from volatile memory device 806 to non-volatile memory device 802 and control the initial programming of source data 814 to non-volatile memory device 802 to become intermediate data 816 on non-volatile memory device 802. For example, memory controller 804 may send a command indicative of a multi-pass program operation to non-volatile memory device 802. In response to receiving the command, non-volatile memory device 802 may perform the coarse programming of source data 814 to become intermediate data 816.

Different from memory system 700, which generates indicator data 718 in response to power loss by non-volatile memory device 702, memory system 800 can generate indicator data 818 based on source data 814 in advance of power loss during normal operations (when the power is on) by memory controller 804. In some implementations, memory controller 804 includes an indicator data (ID) generator 810 configured to generate indicator data 818 based on source data 814 to be initially programmed to non-volatile memory device 802. For example, indicator data generator 810 may be implemented as a firmware module executed by processor 308 of memory controller 300. Indicator data 818 can include any suitable auxiliary data that can be generated based on source data 814, and that can be configured to recover source data 814 from intermediate data 816. In some implementations, indicator data 818 includes a bitmap, for example, of level indicator information related to the intermediate levels of intermediate data 816 and/or the final levels of source data 814. indicator data generator 810 can generate indicator data 818 using any suitable methods, for example, based on the parity information of source data 814. In some implementations, the size of indicator data 818 is smaller than the size of source data 814. That is, the data size can be reduced from source data 814 to the corresponding indicator data 818. For example, one page of a piece of indicator data 818 may correspond to N pages of source data 814 (e.g., a piece of N-bits data), where N is an integer greater than 1. In one example, when source data 814 is a piece of 4-bits data, for each of the 16 values, a piece of indicator data 818 may be generated as a parity check of the corresponding 4 bits of binary values.

As shown in FIG. 8, indicator data generator 810 of memory controller 804 can be further configured to store indicator data 818 in volatile memory device 806. Although volatile memory device 806 is shown in FIG. 8 as outside of memory controller 804 (e.g., as DRAM 304 of memory controller 300 in FIG. 3), it is understood that in some examples, volatile memory device 806 may be part of memory controller 804 (e.g., as SRAM 310 of memory controller 300 in FIG. 3). That is, memory controller 804 can include volatile memory device 806 (e.g., an SRAM) configured to store indicator data 818. In some implementations, indicator data 818 is temporarily stored (cached) in volatile memory device 806 and refreshed, for example, as source data 814 refreshes. The above-described data transfer and generation processes occur when memory system 800 is powered on (without power loss), which are labeled by solid line arrows.

In case power loss happens to memory system 800, PLP circuit 808 detects the power loss and triggers the power loss handling processes of memory system 800, according to some implementations. PLP circuit 808 can include one or more capacitors or any other suitable energy storage components coupled to memory controller 804, volatile memory device 806, non-volatile memory device 802 and configured to provide power to memory controller 804, volatile memory device 806, non-volatile memory device 802 in response to the power loss of memory system 800.

In response to the power loss of memory system 800, memory controller 804 can be configured to control the transmission of indicator data 818, for example, from volatile memory device 806, to non-volatile memory device 802 through I/O interfaces (e.g., DRAM interface 314 and NAND interface 312 of memory controller 300 in FIG. 3). In some implementations, indicator data 818 is stored in a dedicated area of non-volatile memory device 802, for example, an internal SLC area, instead of normal xLC areas for data storage. In some implementations, memory controller 804 controls the transmission of indicator data 818 to non-volatile memory device 802 only in response to the power loss of memory system 800. That is, indicator data 818 may be cached and refreshed in volatile memory device 806, but cannot be flushed to non-volatile memory device 802 when the power of memory system 800 keeps on, according to some implementations. The data transfer and generation processes triggered by power loss are labeled by dash line arrows in FIG. 8. Compared with memory system 700, when handling power loss, memory system 800 can transfer only indicator data 818, which has a smaller size than source data 814, to non-volatile memory device 802, and does not need to generate indicator data 818 by non-volatile memory device 802 again, thereby reducing the required PLP time.

Since intermediate data 816 and indicator data 818 are stored in non-volatile memory device 802 and thus, do not vanish after power loss, when the power of memory system 800 resumes, memory controller 804 and/or non-volatile memory device 802 can recover (regenerate) source data 814 based on intermediate data 816 and indicator data 818 using any suitable data recovery methods. In some implementations, source data 814 is recovered based on an operation (e.g., a logical operation) of a first result from a read operation of indicator data 818 a second result from a read operation of intermediate data. In one example, an SLC read operation may be performed to obtain a value DL from indicator data 818, and two xLC read operations may be performed with different sets of read voltages to obtain two values L− and L+ from intermediate data 816. Source data 814 may be recovered by combining the values DL, L−, and L+, for example, by performing the logical operation of ~DL&L−+DL&L+. In some implementations, memory controller 804 is further configured to in response to the power resume of memory system 800, retrieve intermediate data 816 and indicator data 818 from non-volatile memory device 802, and recover source data 814 based on intermediate data 816 and indicator data 818. For example, the I/O interfaces of memory controller 804 (e.g., NAND interface 312 of memory controller 300 in FIG. 3) may retrieve intermediate data 816 and indicator data 818 from non-volatile memory device 802, and the processor of memory controller 804 (e.g., processor 308 of memory controller 300 in FIG. 3) may recover source data 814 based on intermediate data 816 and indicator data 818. The above-described data transfer and recovery processes triggered by power resume are labeled by dash dot line arrows in FIG. 8. In some implementations, non-volatile memory device 802 is configured to in response to power resume of memory system 800, recover source data 814 based on intermediate data 816 and indicator data 818, and transmit the recovered source data 814 to memory controller 804. For example, the I/O interfaces of memory controller 804 (e.g., NAND interface 312 of memory controller 300 in FIG. 3) may receive recovered source data 814 from non-volatile memory device 802, which is recovered by non-volatile memory device 802.

It is understood that once source data 814 is recovered, memory system 800 may either resume the multi-pass program operation by proceeding to the fine program pass in which non-volatile memory device 802 further programs recovered source data 814 into program data (at final levels), or repeat the multi-pass program operation by returning to the coarse program pass in which non-volatile memory device 802 programs recovered source data 814 into intermediate data 816 again. It is also understood that under normal operations without power loss, after the coarse program pass (initial programming), memory system 800 may continue the multi-pass program operation by proceeding to the fine program pass in which non-volatile memory device 802 further programs source data 814 into programmed data.

FIG. 9 illustrates a flowchart of a method 900 for operating a memory controller, according to some aspects of the present disclosure. The memory controller may be any suitable memory controller disclosed herein, such as memory controller 804. It is understood that the operations shown in method 900 may not be exhaustive and that other operations can be performed as well before, after, or between any of the illustrated operations. Further, some of the operations may be performed simultaneously, or in a different order than shown in FIG. 9.

Referring to FIG. 9, method 900 starts at operation 902, in which a command is transmitted to a non-volatile memory device indicative of initially programming source data to become intermediate data on the non-volatile memory device. For example, as shown in FIG. 8, memory controller 804 may transmit source data 814 to non-volatile memory device 802, as well as a command to non-volatile memory device 802 instructing non-volatile memory device 802 to perform coarse programming of source data 814 to become intermediate data 816.

Method 900 proceeds to operation 904, as illustrated in FIG. 9, in which indicator data is generated based on the source data to be initially programmed to the non-volatile memory device. The indicator data can be configured to recover the source data. The indicator data can include a bitmap. In some implementations, the size of the indicator data is smaller than the size of the source data. Method 900 proceeds to operation 906, as illustrated in FIG. 9, in which the indicator data is stored in a volatile memory device. For example, as shown in FIG. 8, memory controller 804 may generate indicator data 818 based on source data 814 and store indicator data 818 in volatile memory device 806.

Method 900 proceeds to operation 908, as illustrated in FIG. 9, in which in response to power loss, the indicator data is transmitted to the non-volatile memory device. In some implementations, the indicator data is transmitted to the non-volatile memory device only in response to the power loss. For example, as shown in FIG. 8, memory controller 804 may, in response to power loss, transmit indicator data 818 from volatile memory device 806 to non-volatile memory device 802.

Method 900 proceeds to operation 910, as illustrated in FIG. 9, in which, in response to power resume, the intermediate data and the indicator data are retrieved from the non-volatile memory device. Method 900 proceeds to operation 912, as illustrated in FIG. 9, in which the source data is recovered based on the intermediate data and the indicator data. For example, as shown in FIG. 8, memory controller 804 may, in response to power resume, retrieve intermediate data 816 and indicator data 818 from non-volatile memory device 802 and recover source data 814 based on intermediate data 816 and indicator data 818. It is understood that in some examples, the recovered data is received directly, which was recovered based on the intermediate data and the indicator data by the non-volatile memory device.

It is understood that after the source data is recovered, the recovered source data may be further programmed to become programmed data or programmed again to become intermediate data. It is also understood in response to no power loss, after the initial programming of the source data, the source data is further programmed to become programmed data.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 804 in FIG. 8. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A memory system, comprising:
a non-volatile memory device; and
a memory controller coupled to the non-volatile memory device and configured to:
generate indicator data based on source data to be initially programmed to the non-volatile memory device, wherein the indicator data is configured to recover the source data;
control initial programming of the source data to the non-volatile memory device to become intermediate data on the non-volatile memory device, wherein the indicator data comprises a bitmap of level indicator information related to intermediate levels of the intermediate data and/or final levels of the source data; and
in response to power loss of the memory system, control transmission of the indicator data to the non-volatile memory device.

2. The memory system of claim 1, wherein the memory controller is further configured to, in response to power resume of the memory system, retrieve the intermediate data and the indicator data, and recover the source data based on the intermediate data and the indicator data.

3. The memory system of claim 1, wherein the non-volatile memory device is configured to, in response to power resume of the memory system, recover the source data based on the intermediate data and the indicator data, and transmit the recovered data to the memory controller.

4. The memory system of claim 1, wherein the non-volatile memory device is further configured to, after the initial programming of the source data, further program the source data to become programmed data.

5. The memory system of claim 1, wherein a size of the indicator data is smaller than a size of the source data.

6. The memory system of claim 1, wherein the memory controller comprises a volatile memory configured to store the indicator data.

7. The memory system of claim 6, wherein the memory controller is further configured to:

in response to power loss of the memory system, control transmission of the indicator data from the volatile memory to the non-volatile memory device.

8. The memory system of claim 6, wherein the memory controller is further configured to:

in response to the memory system being in a power-on state, prevent transmission of the indicator data from the volatile memory to the non-volatile memory device.

9. The memory system of claim 1, further comprising a power loss protection (PLP) circuit coupled to the memory controller and the non-volatile memory device and configured to provide power to the memory controller and the non-volatile memory device in response to the power loss of the memory system.

10. The memory system of claim 1, wherein the memory controller is configured to control the transmission of the indicator data to the non-volatile memory device only in response to the power loss of the memory system.

11. The memory system of claim 1, wherein the non-volatile memory device comprises a NAND Flash memory device.

12. The memory system of claim 1, wherein the source data is to be proceeded in a multi-pass program operation including a coarse programming to initial program the source data to become the intermediate data and a fine programming to further program the source data to become the programmed data.

13. The memory system of claim 1, wherein the indicator data further comprises auxiliary data configured to recover the source data based on the intermediate data.

14. A memory controller, comprising:

an interface coupled to a non-volatile memory device; and a processor coupled to the interface and configured to:

generate indicator data based on source data to be initially programmed to the non-volatile memory device, wherein the indicator data is configured to recover the source data;

control initial programming of the source data to the non-volatile memory device to become intermediate data on the non-volatile memory device, wherein the indicator data comprises a bitmap of level indicator information related to intermediate levels of the intermediate data and/or final levels of the source data; and in response to power loss of the memory controller, control transmission of the indicator data to the non-volatile memory device through the interface.

15. A method of operating a memory controller, comprising:

generating indicator data based on source data to be initially programmed to a non-volatile memory device, wherein the indicator data is configured to recover the source data;

transmitting a command to the non-volatile memory device indicative of initially programming the source data to become intermediate data on the non-volatile memory device, wherein the indicator data comprises a bitmap of level indicator information related to intermediate levels of the intermediate data and/or final levels of the source data; and in response to power loss, transmitting the indicator data to the non-volatile memory device.

16. The method of claim 15, further comprising:

in response to power resume, retrieving the intermediate data and the indicator data from the non-volatile memory device; and recovering the source data based on the intermediate data and the indicator data.

17. The method of claim 15, further comprising:

receiving recovered data from the non-volatile memory device, wherein the source data is recovered by the non-volatile memory device based on the intermediate data and the indicator data in response to power resume.

18. The method of claim 15, wherein a size of the indicator data is smaller than a size of the source data.

19. The method of claim 15, further comprising storing the indicator data in a volatile memory.

20. The method of claim 15, further comprising transmitting the indicator data to the non-volatile memory device only in response to the power loss.

* * * * *